US010250314B2

(12) United States Patent
Leung et al.

(10) Patent No.: US 10,250,314 B2
(45) Date of Patent: *Apr. 2, 2019

(54) MULTI-WAY DIVERSITY RECEIVER WITH MULTIPLE SYNTHESIZERS IN A CARRIER AGGREGATION TRANSCEIVER

(71) Applicant: QUALCOMM Incorporated, San Diego, CA (US)

(72) Inventors: Lai Kan Leung, San Marcos, CA (US); Chiewcharn Narathong, Laguna Niguel, CA (US); Rajagopalan Rangarajan, San Diego, CA (US); Dongling Pan, San Diego, CA (US); Yiwu Tang, San Diego, CA (US); Aleksandar Miodrag Tasic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/638,215

(22) Filed: Jun. 29, 2017

(65) Prior Publication Data

US 2017/0302358 A1 Oct. 19, 2017

Related U.S. Application Data

(63) Continuation of application No. 14/677,056, filed on Apr. 2, 2015, now Pat. No. 9,712,226.

(Continued)

(51) Int. Cl.
*H04B 1/16* (2006.01)
*H04B 7/08* (2006.01)
(Continued)

(52) U.S. Cl.
CPC ......... *H04B 7/0897* (2013.01); *H04B 1/0082* (2013.01); *H04B 1/16* (2013.01); *H04L 27/152* (2013.01)

(58) Field of Classification Search
CPC ...... H04B 7/0897; H04B 1/0082; H04B 1/16; H04L 27/152
(Continued)

(56) References Cited

U.S. PATENT DOCUMENTS 8,055,211 B2 11/2011 Chance et al.
8,583,066 B2 11/2013 Soul et al.
(Continued)

FOREIGN PATENT DOCUMENTS

CN 102307049 A 1/2012

OTHER PUBLICATIONS

International Search Report and Written Opinion—PCT/US2015/024189—ISA/EPO—dated Jun. 22, 2015.

*Primary Examiner* — Sonny Trinh
(74) *Attorney, Agent, or Firm* — Patterson & Sheridan, L.L.P.

(57) ABSTRACT

Certain aspects of the present disclosure provide multi-way diversity receivers with multiple synthesizers. Such a multi-way diversity receiver may be implemented in a carrier aggregation (CA) transceiver. One example wireless reception diversity circuit generally includes three or more receive paths for processing received signals and two or more frequency synthesizing circuits configured to generate local oscillating signals to downconvert the received signals. Each of the frequency synthesizing circuits is shared by at most two of the receive paths, and each pair of the frequency synthesizing circuits may generate a pair of local oscillating signals having the same frequency.

30 Claims, 10 Drawing Sheets

Related U.S. Application Data

(60) Provisional application No. 61/993,325, filed on May 15, 2014.

(51) Int. Cl.
*H04L 27/152* (2006.01)
*H04B 1/00* (2006.01)

(58) Field of Classification Search
USPC ......................................................... 455/208
See application file for complete search history.

(56) References Cited

U.S. PATENT DOCUMENTS

| | | |
|---|---|---|
| 8,781,524 B2 | 7/2014 | Watanabe |
| 9,712,226 B2 * | 7/2017 | Leung .................. H04B 7/0897 |
| 2010/0151908 A1 | 6/2010 | Skarby et al. |
| 2012/0057621 A1 | 3/2012 | Hong et al. |
| 2013/0051284 A1 | 2/2013 | Khlat |
| 2013/0086410 A1 | 4/2013 | Kurd et al. |
| 2013/0229954 A1 | 9/2013 | Narathong et al. |
| 2013/0230080 A1 | 9/2013 | Gudem et al. |
| 2014/0179253 A1 | 6/2014 | Gudem et al. |
| 2015/0333815 A1 | 11/2015 | Leung et al. |

* cited by examiner

MULTI-WAY DIVERSITY RECEIVER WITH MULTIPLE SYNTHESIZERS IN A CARRIER AGGREGATION TRANSCEIVER

CROSS-REFERENCE TO RELATED APPLICATIONS

This application is a continuation application of U.S. patent application Ser. No. 14/677,056, filed Apr. 2, 2015 and entitled "MULTI-WAY DIVERSITY RECEIVER WITH MULTIPLE SYNTHESIZERS IN A CARRIER AGGREGATION TRANSCEIVER," which claims benefit of U.S. Provisional Patent Application Ser. No. 61/993,325, filed May 15, 2014 and entitled "MULTI-WAY DIVERSITY RECEIVER WITH MULTIPLE SYNTHESIZERS IN A CARRIER AGGREGATION TRANSCEIVER," which are herein incorporated by reference in their entireties.

TECHNICAL FIELD

Certain aspects of the present disclosure generally relate to radio frequency (RF) circuits for wireless communications and, more particularly, to multi-way diversity receivers with multiple frequency synthesizing circuits.

BACKGROUND

Wireless communication networks are widely deployed to provide various communication services such as telephony, video, data, messaging, broadcasts, and so on. Such networks, which are usually multiple access networks, support communications for multiple users by sharing the available network resources. For example, one network may be a 3G (the third generation of mobile phone standards and technology) system, which may provide network service via any one of various 3G radio access technologies (RATs) including EVDO (Evolution-Data Optimized), 1×RTT (1 times Radio Transmission Technology, or simply 1×), W-CDMA (Wideband Code Division Multiple Access), UMTS-TDD (Universal Mobile Telecommunications System—Time Division Duplexing), HSPA (High Speed Packet Access), GPRS (General Packet Radio Service), or EDGE (Enhanced Data rates for Global Evolution). The 3G network is a wide area cellular telephone network that evolved to incorporate high-speed internet access and video telephony, in addition to voice calls. Furthermore, a 3G network may be more established and provide larger coverage areas than other network systems. Such multiple access networks may also include code division multiple access (CDMA) systems, time division multiple access (TDMA) systems, frequency division multiple access (FDMA) systems, orthogonal frequency division multiple access (OFDMA) systems, single-carrier FDMA (SC-FDMA) networks, 3rd Generation Partnership Project (3GPP) Long Term Evolution (LTE) networks, and Long Term Evolution Advanced (LTE-A) networks.

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station.

SUMMARY

Certain aspects of the present disclosure generally relate to multi-way diversity receivers having multiple synthesizers. Such a multi-way diversity receiver may be implemented in a carrier aggregation (CA) transceiver.

Certain aspects of the present disclosure provide a wireless reception diversity circuit. The diversity circuit generally includes three or more receive paths for processing received signals and two or more frequency synthesizing circuits configured to generate local oscillating signals to downconvert the received signals, wherein each of the frequency synthesizing circuits is shared by at most two of the receive paths and wherein each pair of the frequency synthesizing circuits generates a pair of the local oscillating signals having the same frequency.

According to certain aspects, a single receive path is connected with one of the frequency synthesizing circuits that is not connected with any other receive path.

According to certain aspects, each of the receive paths is associated with its own antenna.

According to certain aspects, each pair of the frequency synthesizing circuits generates a pair of the local oscillating signals having the same frequency. For certain aspects, the pair of local oscillating signals having the same frequency are generated by two voltage-controlled oscillators (VCOs) outputting two different frequencies. The two VCOs may be coupled to two frequency dividers operating with two different frequency divisors, such that the pair of local oscillating signals have the same frequency. For certain aspects, different pairs of the frequency synthesizing circuits generate pairs of the local oscillating signals having different frequencies.

According to certain aspects, the three or more receive paths include 6 receive paths, and the two or more frequency synthesizing circuits include 3 frequency synthesizing circuits. For certain aspects, a first number of the 6 receive paths is designated for a first carrier, and a second number of the 6 receive paths is designated for a second carrier, different from the first carrier. For certain aspects, the 6 receive paths are designated for a single carrier. In this case, the 3 frequency synthesizing circuits may generate three local oscillating signals having the same frequency.

According to certain aspects, the three or more receive paths include 8 receive paths, and the two or more frequency synthesizing circuits include 4 frequency synthesizing circuits. For certain aspects, a first pair of the 4 frequency synthesizing circuits generates a first two local oscillating signals having the same first frequency, and a second pair of the 4 frequency synthesizing circuits generates a second two local oscillating signals having the same second frequency. For certain aspects, a first number of the 8 receive paths is designated for a first carrier, and a second number of the 8 receive paths is designated for a second carrier, different from the first carrier. For other aspects, the 8 receive paths are designated for a single carrier. In this case, the 4 frequency synthesizing circuits may generate four local oscillating signals having the same frequency. For certain aspects, 4 of the 8 receive paths and/or 2 of the 4 frequency synthesizing circuits are disabled.

According to certain aspects, the wireless reception diversity circuit is part of a carrier aggregation (CA) transceiver, and each of the frequency synthesizing circuits is a CA frequency synthesizing circuit for a particular component carrier. For certain aspects, a portion of the CA transceiver is disabled.

According to certain aspects, each frequency synthesizing circuit includes a voltage-controlled oscillator (VCO) and a phase-locked loop (PLL). For certain aspects, each frequency synthesizing circuit further includes at least one of an amplifier, a buffer, an attenuator, or a programmable divider.

According to certain aspects, each receive path includes a low noise amplifier (LNA) configured to amplify one of the received signals and a mixing circuit configured to mix the amplified signal with one of the local oscillating signals.

Certain aspects of the present disclosure provide a wireless reception diversity circuit. The diversity circuit generally includes a first receive path; a second receive path; a third receive path; a first frequency synthesizing circuit configured to generate a first local oscillating signal having a first frequency, wherein the first local oscillating signal is connected with a first mixing circuit in the first receive path and with a second mixing circuit in the second receive path; and a second frequency synthesizing circuit configured to generate a second local oscillating signal having a second frequency equal to the first frequency, wherein the second local oscillating signal is connected with a third mixing circuit in the third receive path.

According to certain aspects, the diversity circuit further includes a fourth receive path, wherein the second local oscillating signal is connected with a fourth mixing circuit in the fourth receive path. For certain aspects, each of the first, second, third, and fourth receive paths is associated with its own antenna. For certain aspects, the diversity circuit further includes a fifth receive path; a sixth receive path; and a third frequency synthesizing circuit configured to generate a third local oscillating signal having a third frequency, wherein the third local oscillating signal is connected with a fifth mixing circuit in the fifth receive path and with a sixth mixing circuit in the sixth receive path. For certain aspects, the third frequency may be different from the first frequency, while in other aspects, the third frequency may be the same as the first and second frequencies. For certain aspects, the first, second, third, fourth, fifth, and sixth receive paths are designated for a single carrier. In this case, the first, second, and third local oscillating signals may have the same frequency.

According to certain aspects, the diversity circuit further includes a seventh receive path; an eighth receive path; and a fourth frequency synthesizing circuit configured to generate a fourth local oscillating signal having a fourth frequency equal to the third frequency, wherein the fourth local oscillating signal is connected with a seventh mixing circuit in the seventh receive path and with an eighth mixing circuit in the eighth receive path. In this case, the third frequency may be different from the first frequency. For certain aspects, the first, second, third, and fourth receive paths are designated for a first carrier, and the fifth, sixth, seventh, and eighth receive paths are designated for a second carrier, different from the first carrier. For other aspects, the first, second, third, fourth, fifth, sixth, seventh, and eighth receive paths are designated for a single carrier. In this case, the first, second, third, and fourth local oscillating signals may have the same frequency.

According to certain aspects, the diversity circuit further includes a fourth receive path; a fifth receive path; a sixth receive path; a third frequency synthesizing circuit configured to generate a third local oscillating signal having a third frequency; and a fourth frequency synthesizing circuit configured to generate a fourth local oscillating signal having a fourth frequency, wherein the third local oscillating signal is connected with a fourth mixing circuit in the fourth receive path and with a fifth mixing circuit in the fifth receive path and wherein the fourth local oscillating signal is connected with a sixth mixing circuit in the sixth receive path. For certain aspects, the third frequency may be different from the first frequency, while in other aspects, the third frequency may be the same as the first and second frequencies. For certain aspects, the first, second, and third receive paths are designated for a first carrier, and the fourth, fifth, and sixth receive paths are designated for a second carrier, different from the first carrier. For other aspects, the first, second, third, fourth, fifth, and sixth receive paths are designated for a single carrier. In this case, the first, second, third, and fourth local oscillating signals may have the same frequency.

According to certain aspects, the wireless reception diversity circuit is part of a CA transceiver, and each of the first and second frequency synthesizing circuits is a CA frequency synthesizing circuit for a particular component carrier. For certain aspects, a portion of the CA transceiver is disabled.

According to certain aspects, each of the first and second frequency synthesizing circuits includes a VCO and a PLL. For certain aspects, each of the first and second frequency synthesizing circuits further includes at least one of an amplifier, a buffer, an attenuator, or a programmable divider.

According to certain aspects, the first frequency synthesizing circuit includes a first VCO configured to generate the first local oscillating signal, and the second frequency synthesizing circuit comprises a second VCO configured to generate the second local oscillating signal. In this case, the first and second VCOs may concurrently output signals having two different frequencies. The first and second VCOs may be coupled to two frequency dividers operating with two different divisors, such that the first and second local oscillating signals have the same frequency.

According to certain aspects, each of the first, second, and third receive paths is associated with its own antenna.

Certain aspects of the present disclosure provide a method for wireless communications. The method generally includes receiving and processing signals via three or more receive paths; and generating, from two or more frequency synthesizing circuits, local oscillating signals to downconvert the received signals, wherein each of the frequency synthesizing circuits is shared by at most two of the receive paths and wherein each pair of the frequency synthesizing circuits generates a pair of the local oscillating signals having the same frequency.

Certain aspects of the present disclosure provide a method for wireless communications. The method generally includes receiving and processing a first signal via a first receive path; receiving and processing a second signal via a second receive path; receiving and processing a third signal via a third receive path; generating a first local oscillating signal having a first frequency; mixing the first local oscillating signal with the processed first signal via a first mixing circuit in the first receive path; mixing the first local oscillating signal with the processed second signal via a second mixing circuit in the second receive path; generating a second local oscillating signal having a second frequency equal to the first frequency; and mixing the second local oscillating signal with the processed third signal via a third mixing circuit in the third receive path.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the present disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

The techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), Single Carrier Frequency Division Multiple Access (SC-FDMA), Time Division Synchronous Code Division Multiple Access (TD-SCDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement Institute of Electrical and Electronics Engineers (IEEE) 802.11, IEEE 802.16, Long Term Evolution (LTE) (e.g., in TDD and/or FDD modes), LTE Advanced (LTE-A), or some other standards. A TDMA system may implement Global System for Mobile Communications (GSM) or some other standards. These various standards are known in the art.

An Example Wireless System

Figure 1:
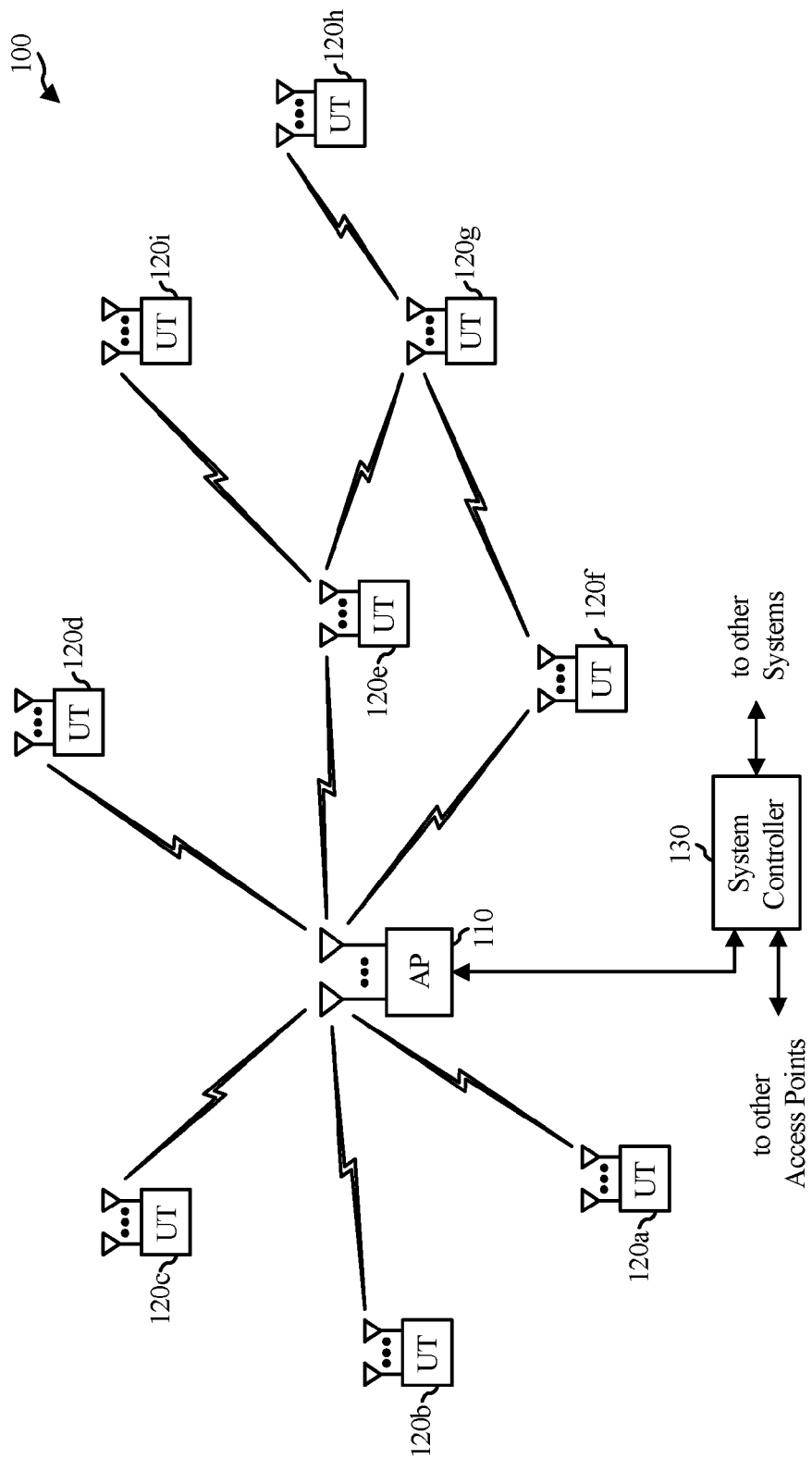
FIG. 1 is a diagram of an example wireless communications network in accordance with certain aspects of the present disclosure.

FIG. 1 illustrates a wireless communications system 100 with access points 110 and user terminals 120. For simplicity, only one access point 110 is shown in FIG. 1. An access point (AP) is generally a fixed station that communicates with the user terminals and may also be referred to as a base station (BS), an evolved Node B (eNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless system 100 may be a time division duplex (TDD) system or a frequency division duplex (FDD) system. For a TDD system, the downlink and uplink share the same frequency band. For an FDD system, the downlink and uplink use different frequency bands. System 100 may also utilize a single carrier or multiple carriers for transmission. Each user terminal may be equipped with a single antenna (e.g., in order to keep costs down) or multiple antennas (e.g., where the additional cost can be supported).

Figure 2:
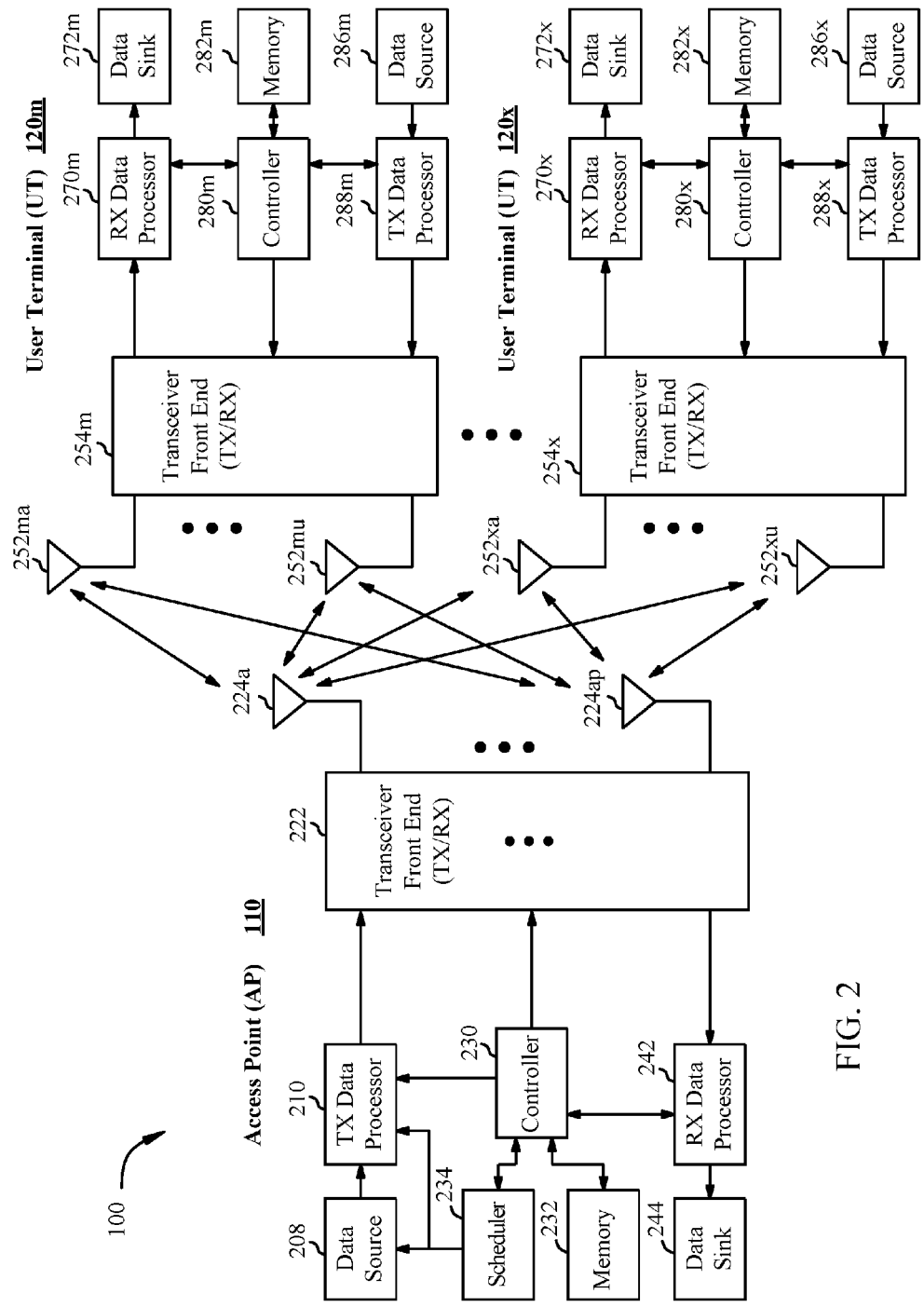
FIG. 2 is a block diagram of an example access point (AP) and example user terminals in accordance with certain aspects of the present disclosure.

FIG. 2 shows a block diagram of access point 110 and two user terminals 120m and 120x in wireless system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the user terminal 120 and may interface with the controller 280.

A number $N_{up}$ of user terminals may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. For certain aspects of the present disclosure, a combination of the signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230.

At each user terminal 120, $N_{ut,m}$ antennas 252 receive the downlink signals from access point 110. For receive diversity at the user terminal 120, the transceiver front end 254 may select signals received from one of the antennas 252 for processing. For certain aspects of the present disclosure, a combination of the signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal.

Those skilled in the art will recognize the techniques described herein may be generally applied in systems utilizing any type of multiple access schemes, such as TDMA, SDMA, Orthogonal Frequency Division Multiple Access (OFDMA), CDMA, SC-FDMA, TD-SCDMA, and combinations thereof.

Figure 3:
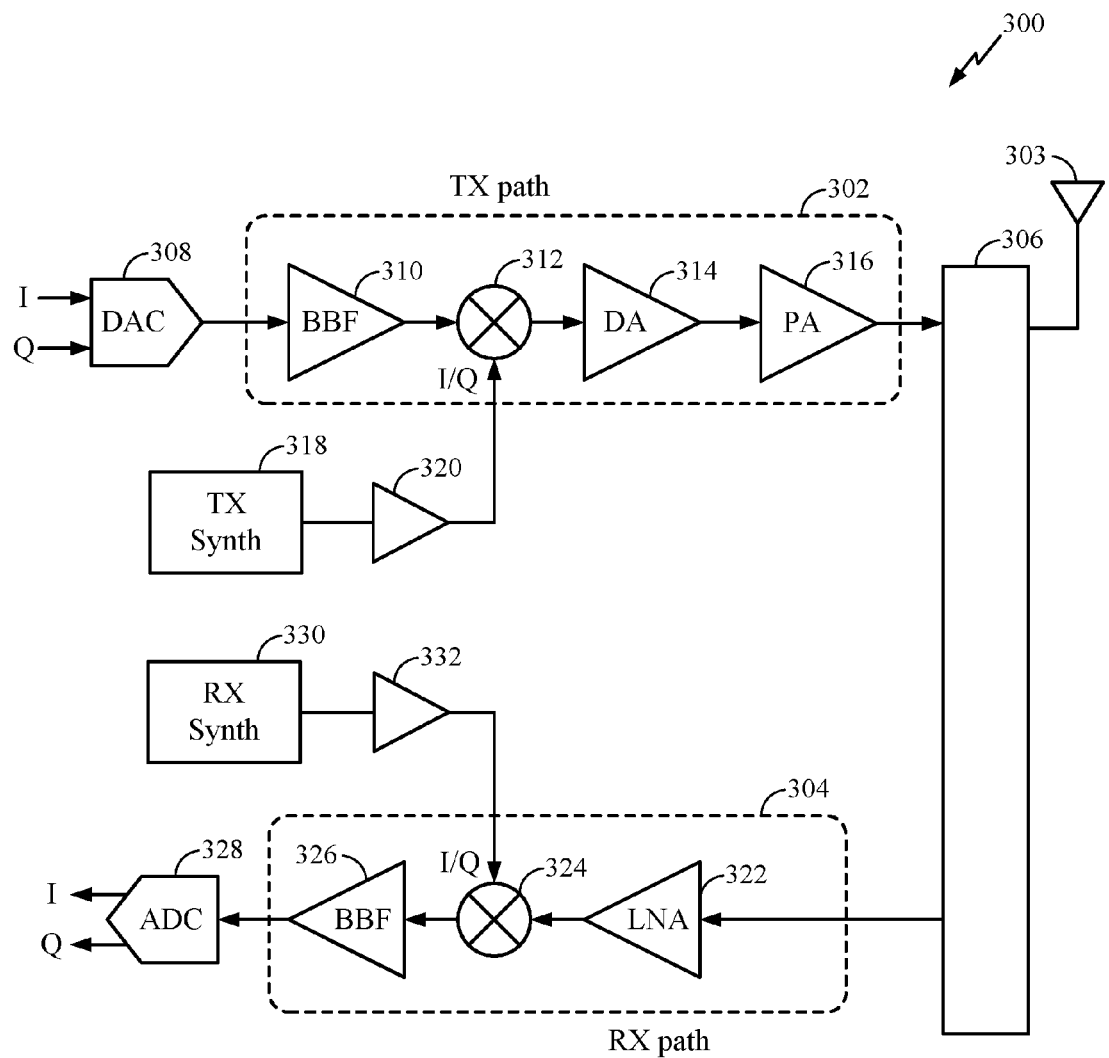
FIG. 3 is a block diagram of an example transceiver front end in accordance with certain aspects of the present disclosure.

FIG. 3 is a block diagram of an example transceiver front end 300, such as transceiver front ends 222, 254 in FIG. 2, in accordance with certain aspects of the present disclosure. The transceiver front end 300 includes a transmit (TX) path 302 (also known as a transmit chain) for transmitting signals via one or more antennas and a receive (RX) path 304 (also known as a receive chain) for receiving signals via the antennas. If the TX path 302 and the RX path 304 share an antenna 303, the paths may be connected with the antenna via an interface 306, which may include any of various suitable RF devices, such as a duplexer, a switch, a diplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier 316. The BBF 310, the mixer 312, and the DA 314 may be included in a radio frequency integrated circuit (RFIC), while the PA 316 is often external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which are amplified by the DA 314 and by the PA 316 before transmission by the antenna 303.

The RX path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning to different frequencies indicates using a variable-frequency oscillator, which involves compromises between stability and tunability. Contemporary systems employ frequency synthesizers with a voltage-controlled oscillator (VCO) to generate a stable, tunable LO with a particular tuning range. Thus, the transmit LO is typically produced by a TX frequency synthesizer 318, which may be buffered or amplified by amplifier 320 before being mixed with the baseband signals in the mixer 312. Similarly, the receive LO is typically produced by an RX frequency synthesizer 330, which may be buffered or amplified by amplifier 332 before being mixed with the RF signals in the mixer 324.

Example Multi-Way Diversity Receiver with Multiple Synthesizers

In wireless communications, diversity may be used to increase the reliability of transmissions by using two or more channels with different characteristics. Because individual channels experience different levels of fading and interference, multiple versions of the same signal may be received via different propagation paths in reception diversity in an effort to combat fading and interference. For example, a 2-way diversity (a.k.a. ordinary diversity, as opposed to multi-way diversity) receiver may use two antennas associated with two different receive paths, one referred to as the "primary path" and the other referred to as the "diversity path." In order to enhance the reception sensitivity and further reduce the impact of multipath fading in radio frequency front ends (RFFEs), a 4-way diversity receiver (4-RxD) is often desired. However, it is challenging to implement a 4-way diversity receiver with good performance (e.g., low phase noise) and low current consumption.

A conventional 2-way diversity receiver may be realized by sharing the local oscillator (LO) path between the primary receive path and the diversity receive path. Similarly, a 4-way diversity receiver may be configured by driving 4 receive paths (e.g., RX path 304) with a single set consisting of a frequency synthesizer and corresponding LO path (which may include an amplifier or buffer and/or a divider). However, due to the loading of the mixers at the LO path outputs, the performance and current consumption are usually poor.

Figure 4:
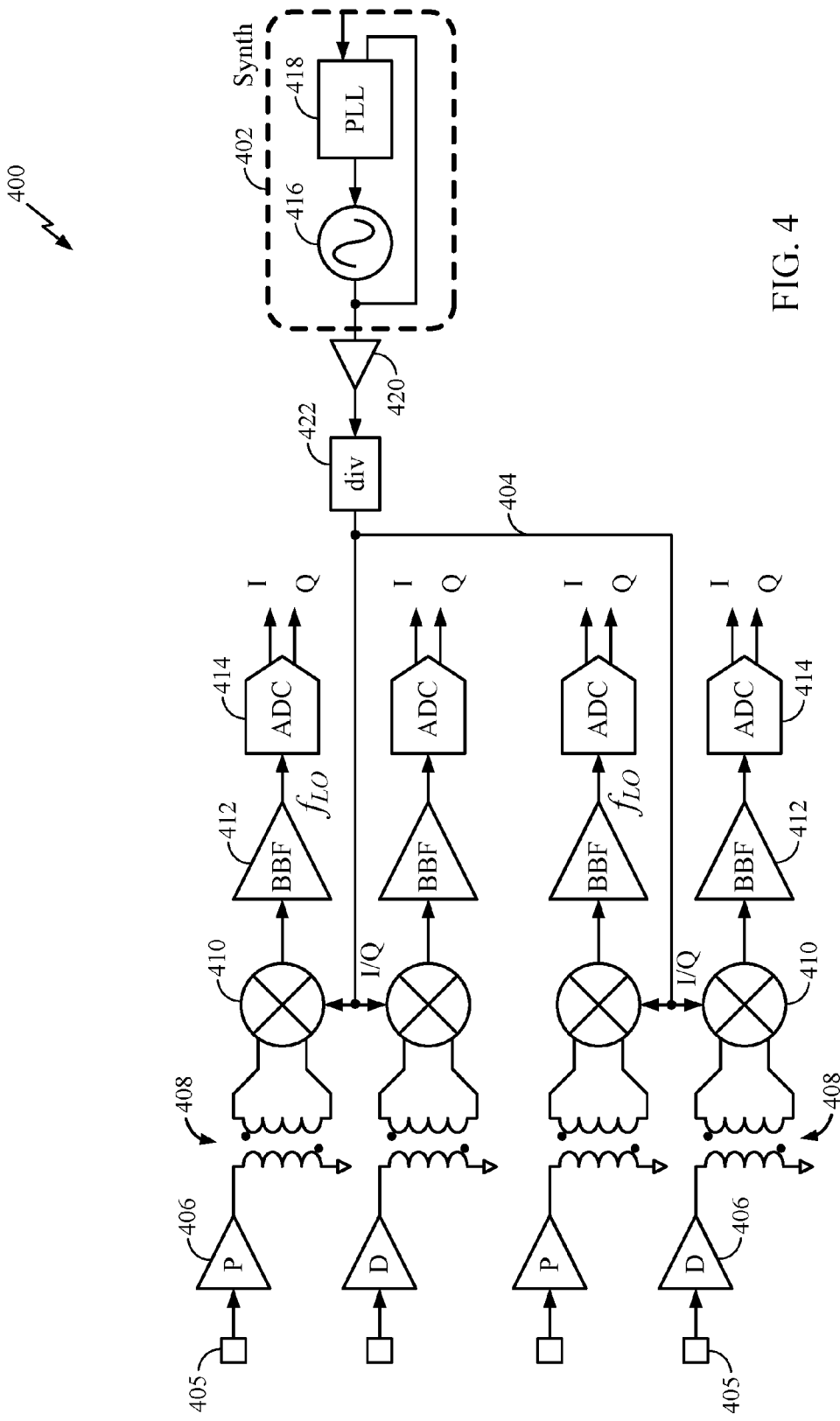
FIG. 4 is an example block diagram of a 4-way diversity receiver (4 RxD) where the 4 receive paths are driven by a single frequency synthesizing circuit, in accordance with certain aspects of the present disclosure.

FIG. 4 illustrates an example 4-way diversity receiver 400, in accordance with certain aspects of the present disclosure. In the receiver 400, one set of frequency synthesizer 402 and corresponding LO path 404 is used to drive 4 or more receive paths. For certain aspects, each receive path may include a low noise amplifier (LNA) 406, a balun 408 for single-ended to differential conversion, a mixer 410, a baseband filter (BBF) 412, and an analog-to-digital converter (ADC) 414 as illustrated in FIG. 4. For other aspects, each receive path may include a differential LNA, a mixer, a BBF, and an ADC (i.e., without a balun for conversion). Each receive path may be associated with its own antenna 405. The frequency synthesizer 402 may include a voltage-controlled oscillator (VCO) 416 and a phase-locked loop (PLL) 418 and be followed by an amplifier 420 configured to amplify, buffer or attenuate the oscillating signal from the VCO 416. The frequency of the oscillating signal output by the amplifier 420 may be divided by a programmable frequency divider 422 to produce the LO signal with the local oscillating frequency ($f_{LO}$) on the LO path 404. For certain aspects, the LO path 404 may have both in-phase (I) and quadrature (Q) components.

By sharing a single frequency synthesizer 402 and LO path 404, the current consumption of the LO path 404 is usually high due to the mixer loading. Furthermore, the phase noise performance is poor due to the limited swing. It is challenging to comply with such design specifications as the far-out phase noise at the duplex frequency and the large-signal noise figure. Current consumption may be further increased to meet the phase noise and noise figure specifications.

Accordingly, what is needed is a multi-way diversity receiver with increased performance and reduced current consumption.

Certain aspects of the present disclosure provide multi-way diversity receivers, where at most two receive paths in the diversity receiver share a frequency synthesizer and corresponding LO path. Such a multi-way diversity receiver may be implemented in a carrier aggregation (CA) transceiver.

Carrier aggregation is used in some radio access technologies (RATs), such as LTE-A, in an effort to increase the bandwidth, and thereby increase bitrates. In carrier aggregation, multiple frequency resources (i.e., carriers) are allocated for sending data. Each aggregated carrier is referred to as a component carrier (CC). In LTE Rel-10, for example, up to five component carriers can be aggregated, leading to a maximum aggregated bandwidth of 100 MHz. The allocation of resources may be contiguous or non-contiguous. Non-contiguous allocation may be either intra-band (i.e., the component carriers belong to the same operating frequency band, but have one or more gaps in between) or inter-band, in which case the component carriers belong to different operating frequency bands. To implement CA in radio frequency front ends (RFFEs), various CA transceivers have been developed.

Figure 5:
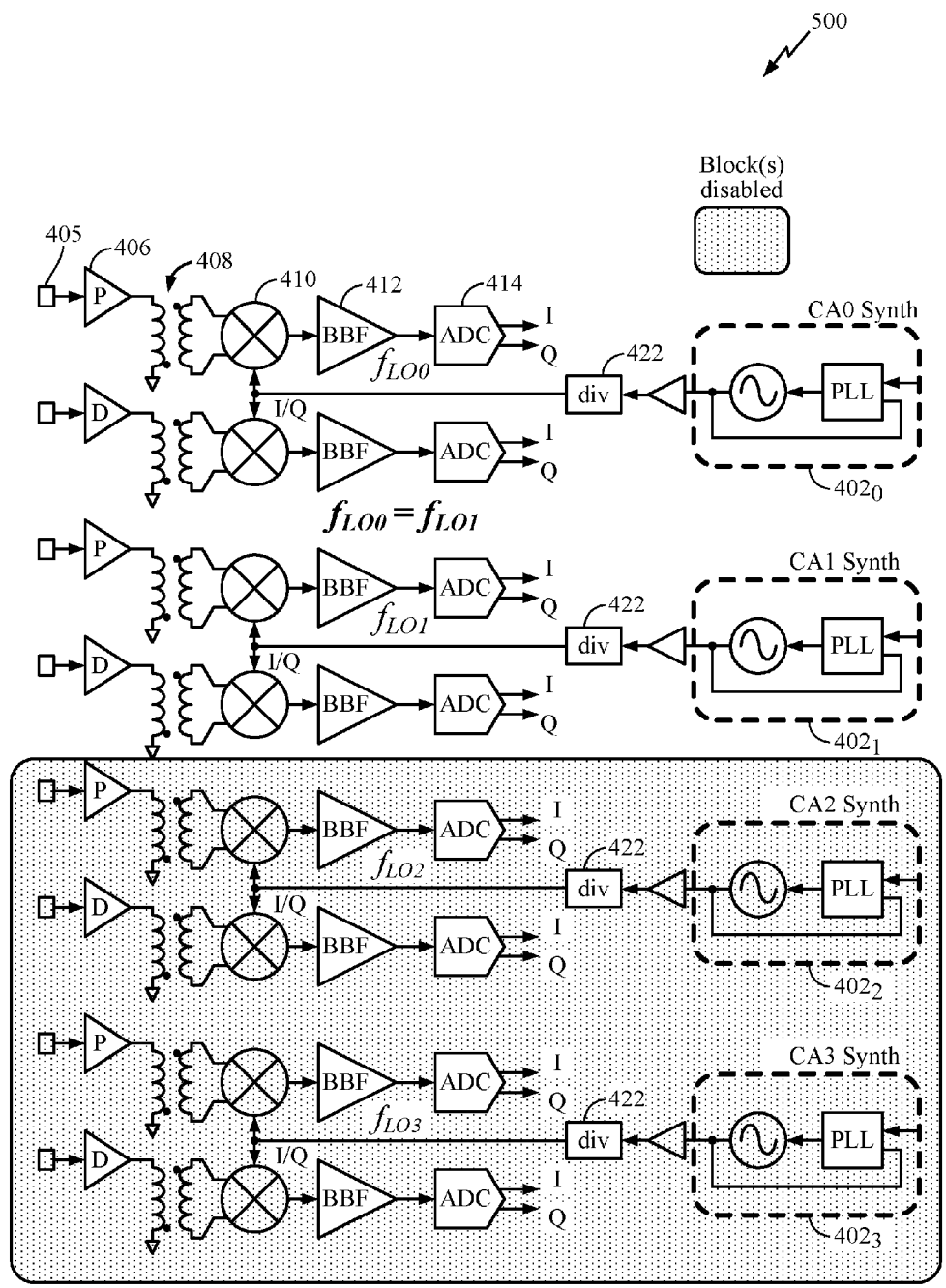
FIG. 5 is an example block diagram of a 4-way diversity receiver in a carrier aggregation (CA) transceiver where the 4 receive paths are driven by 2 frequency synthesizing circuits, generating the same local oscillator (LO) frequency, in accordance with certain aspects of the present disclosure.

In any 4-CA transceiver, in which 4 frequency synthesizers are available (e.g., for generating 4 different LO frequencies for the 4 CA diversity receivers (i.e., 4x P+D receivers)), a 4-way diversity receiver (4 RxD) may be configured by using 2 sets of synthesizers plus corresponding LO paths, generating the same LO frequency, to drive 4 receive paths. For example, FIG. 5 illustrates an example 4-way diversity receiver 500 implemented in a 4-CA transceiver where the 4 receive paths of interest are driven by 2 frequency synthesizing circuits (synthesizers $402_0$, $402_1$), in accordance with certain aspects of the present disclosure. The first LO frequency ($f_{LO0}$) generated by the first frequency synthesizing circuit (labeled "CA0 Synth") is the same as the second LO frequency ($f_{LO1}$) generated by the second frequency synthesizing circuit (labeled "CA1 Synth"). For certain aspects, the two VCOs 416 in synthesizers $402_0$, $402_1$ may output oscillating signals with the same frequency, while for other aspects, the two VCOs 416 may output two oscillating signals with different frequencies. In the latter case, frequency dividers 422 designed with different frequency divisors may be coupled to the VCOs 416 such that $f_{LO0}=f_{LO1}$.

The 4-way diversity receiver 500 has increased performance compared to the 4-way diversity receiver 400 of FIG. 4. For example, the LO signal swing and phase noise is better in the receiver 500 because LO loading is distributed between the 2 frequency synthesizers $402_0$, $402_1$.

Because a 4-way diversity receiver is being implemented in FIG. 5, a portion (e.g., half) of the 4-CA transceiver may be disabled as shown for certain aspects. Although the first four receive paths and first two CA synthesizing circuits (CA0 and CA1) are enabled in the receiver 500 of FIG. 5, any suitable CA synthesizing circuits and receive paths may be enabled instead of those shown.

Figure 6:
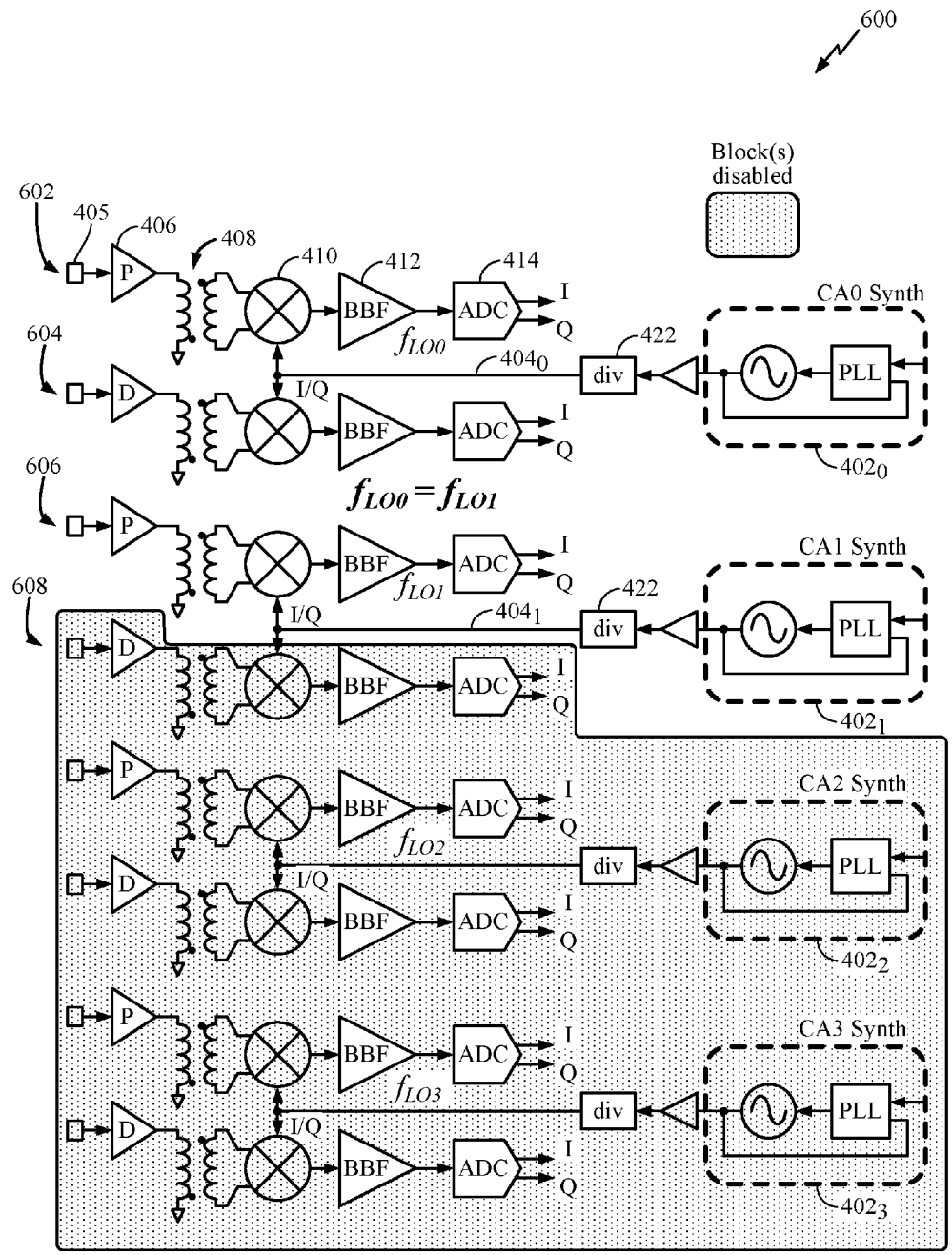
FIG. 6 is an example block diagram of a 3-way diversity receiver in the CA transceiver of FIG. 5, where the 3 receive paths are driven by 2 frequency synthesizing circuits, generating the same LO frequency, in accordance with certain aspects of the present disclosure.

In any 4-CA transceiver, a 3-way diversity receiver (3-RxD) may be configured instead by enabling 2 sets of synthesizers (e.g., synthesizers $402_0$, $402_1$) plus corresponding LO paths $404_0$, $404_1$, generating the same LO frequency, to drive 3 receive paths 602, 604, 606. FIG. 6 illustrates an example 3-way diversity receiver 600 implemented in the CA transceiver of FIG. 5, in accordance with certain aspects of the present disclosure.

Although the first three receive paths and first two CA synthesizing circuits (CA0 Synth and CA1 Synth) are enabled in the receiver 600 of FIG. 6, any two suitable CA synthesizing circuits and three receive paths may be enabled instead of those shown to implement a 3-RxD. Furthermore, even though the diversity path 608 associated with CA1 Synth may be disabled as depicted in FIG. 6, the primary path 606 associated with CA1 Synth may be disabled instead. Likewise, the primary path 602 or the diversity path 604, both associated with CA0 Synth, may be disabled instead of the diversity path 608 associated with CA1 Synth.

Figure 7A:
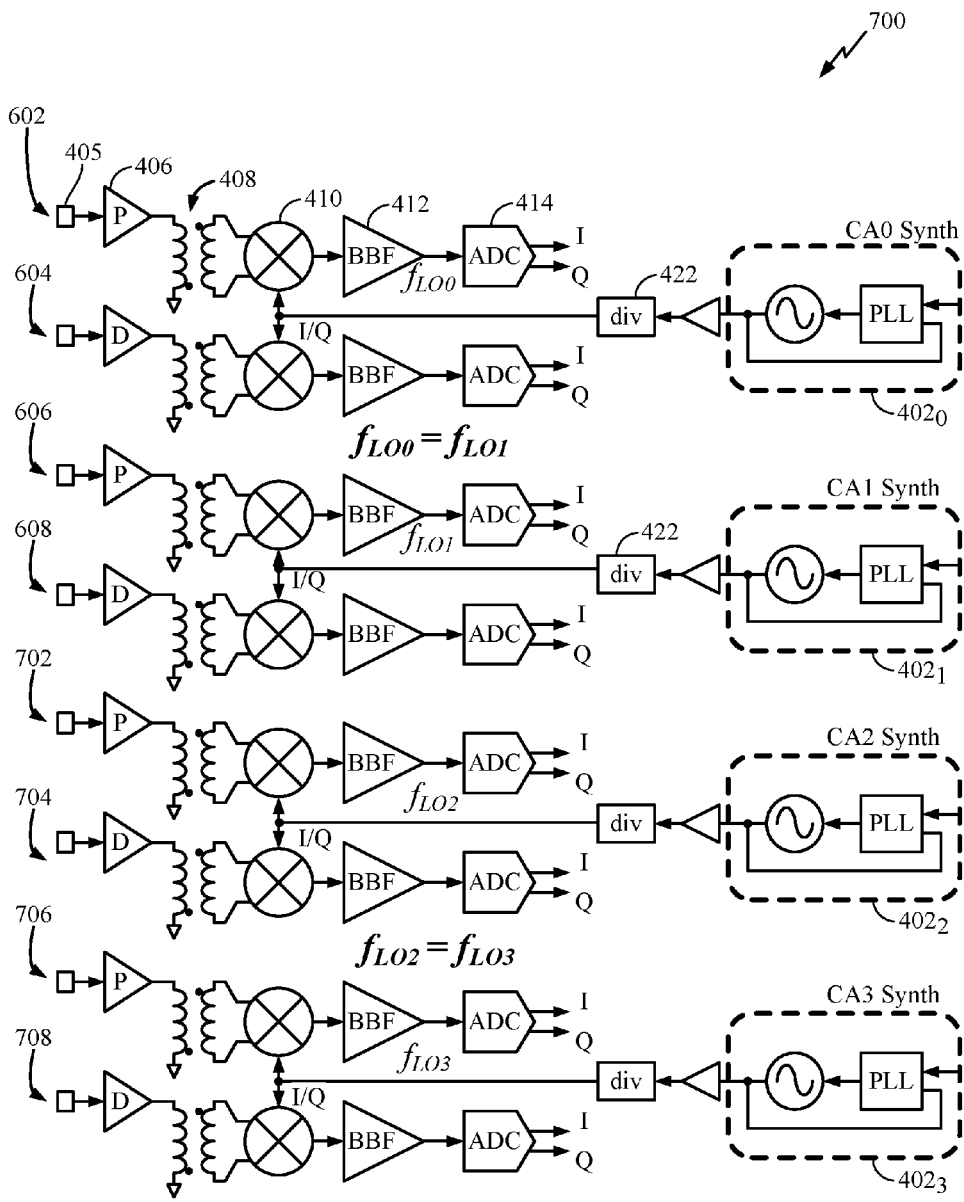
FIG. 7A is an example block diagram of a 2-carrier, 4-way diversity receiver in the CA transceiver of FIG. 5, where the 8 receive paths are driven by 4 frequency synthesizing circuits, generating two different LO frequencies, in accordance with certain aspects of the present disclosure.

In a CA transceiver, a 2-carrier, 4-way diversity receiver may be configured by enabling 4 sets of synthesizers plus corresponding LO paths, generating 2 different LO frequencies, to drive 8 receive paths. FIG. 7A illustrates an example 2-carrier, 4-way diversity receiver 700 implemented in the CA transceiver of FIG. 5, in accordance with certain aspects of the present disclosure. The first LO frequency ($f_{LO0}$) generated by the first frequency synthesizing circuit (CA0 Synth) is the same as the second LO frequency ($f_{LO1}$) generated by the second frequency synthesizing circuit (CA1 Synth). And the third LO frequency ($f_{LO2}$) generated by the third frequency synthesizing circuit (CA2 Synth) is the same as the fourth LO frequency ($f_{LO3}$) generated by the fourth frequency synthesizing circuit (CA3 Synth). For certain aspects, the first four receive paths 602, 604, 606, 608 may be designated for a first carrier as shown, whereas the second four receive paths 702, 704, 706, 708 may be designated for a second carrier, different from the first carrier. Although the first four receive paths 602, 604, 606, 608 and first two CA synthesizing circuits (CA0 Synth and CA1 Synth) are used for the first carrier in the receiver 700 of FIG. 7A, any suitable CA synthesizing circuits and receive paths may be designated for the first carrier. For other aspects, the 8 receive paths in the CA transceiver may be used in a similar configuration to implement an 8-way diversity receiver (8 RxD) (all with the same LO frequency), rather than a 2-carrier, 4 RxD.

The 2-carrier, 4-way diversity receiver 700 has increased performance compared to the 4-way diversity receiver 400 of FIG. 4. For example, the improvement in the phase noise and noise figure is even more significant because the LO loading is distributed among four frequency synthesizers $402_{0-3}$. Furthermore, the overall reduction in the current consumption is significant.

Figure 7B:
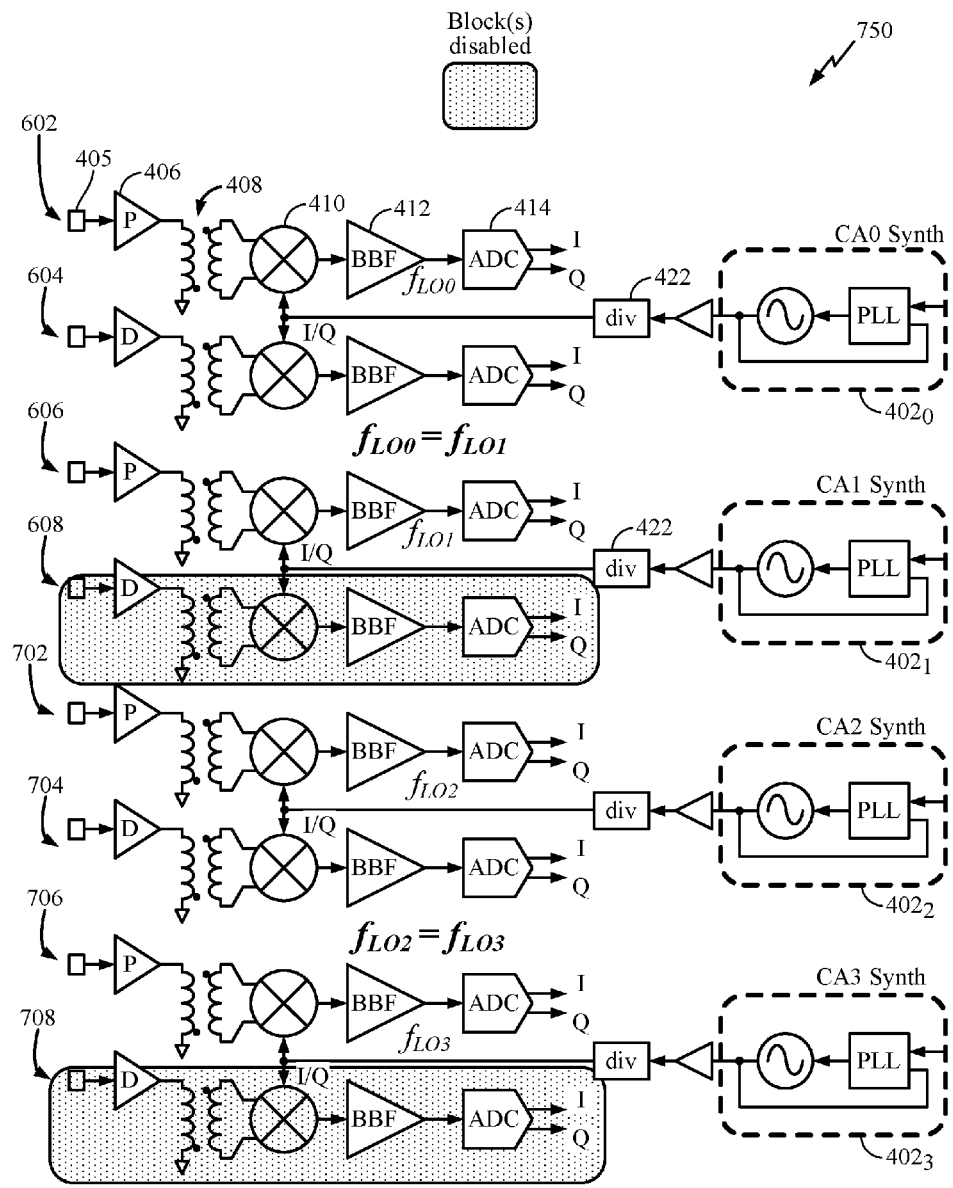
FIG. 7B is an example block diagram of a 2-carrier, 3-way diversity receiver in the CA transceiver of FIG. 5, where the 6 receive paths are driven by 4 frequency synthesizing circuits, generating two different LO frequencies, in accordance with certain aspects of the present disclosure.

In a CA transceiver, a 2-carrier, 3-way diversity receiver (3 RxD) may be configured by enabling 4 sets of synthesizers plus corresponding LO paths, generating 2 different LO frequencies, to drive 6 receive paths. FIG. 7B illustrates an example 2-carrier, 3-way diversity receiver 750 implemented in the CA transceiver of FIG. 5, in accordance with certain aspects of the present disclosure. The first LO frequency ($f_{LO0}$) generated by the first frequency synthesizing circuit (CA0 Synth) is the same as the second LO frequency ($f_{LO1}$) generated by the second frequency synthesizing circuit (CA1 Synth). And the third LO frequency ($f_{LO2}$) generated by the third frequency synthesizing circuit (CA2 Synth) is the same as the fourth LO frequency ($f_{LO3}$) generated by the fourth frequency synthesizing circuit (CA3 Synth). The third and fourth LO frequencies are different from the first and second LO frequencies ($f_{LO3}=f_{LO2}\neq f_{LO0}=f_{LO1}$). For certain aspects, three receive paths 602, 604, 606 may be designated for a first carrier as shown, whereas three other receive paths 702, 704, 706 may be designated for a second carrier, different from the first carrier. For other aspects, the 6 receive paths in the CA transceiver may be used in a similar configuration to implement a 6-way diversity receiver (6 RxD) (all with the same LO frequency), rather than a 2-carrier, 3 RxD.

Although the first three receive paths 602, 604, 606 and first two CA synthesizing circuits (CA0 Synth and CA1 Synth) are used for the first carrier in the receiver 750 of FIG. 7B, any suitable CA synthesizing circuits and receive paths may be designated for the first carrier. As one example alternative, three receive paths 606, 608, 702 may be designated for the first carrier, whereas three other receive paths 604, 706, 708 may be designated for the second carrier. In this alternative case, the second LO frequency ($f_{LO1}$) generated by the second frequency synthesizing circuit (CA1 Synth) is the same as the third LO frequency ($f_{LO2}$) generated by the third frequency synthesizing circuit (CA2 Synth), whereas the first LO frequency ($f_{LO0}$) generated by the first frequency synthesizing circuit (CA0 Synth) is the same as the fourth LO frequency ($f_{LO3}$) generated by the fourth frequency synthesizing circuit (CA3 Synth). The first and fourth LO frequencies are different from the second and third LO frequencies ($f_{LO0}=f_{LO3}\neq f_{LO1}=f_{LO2}$) in this example.

Figure 8:
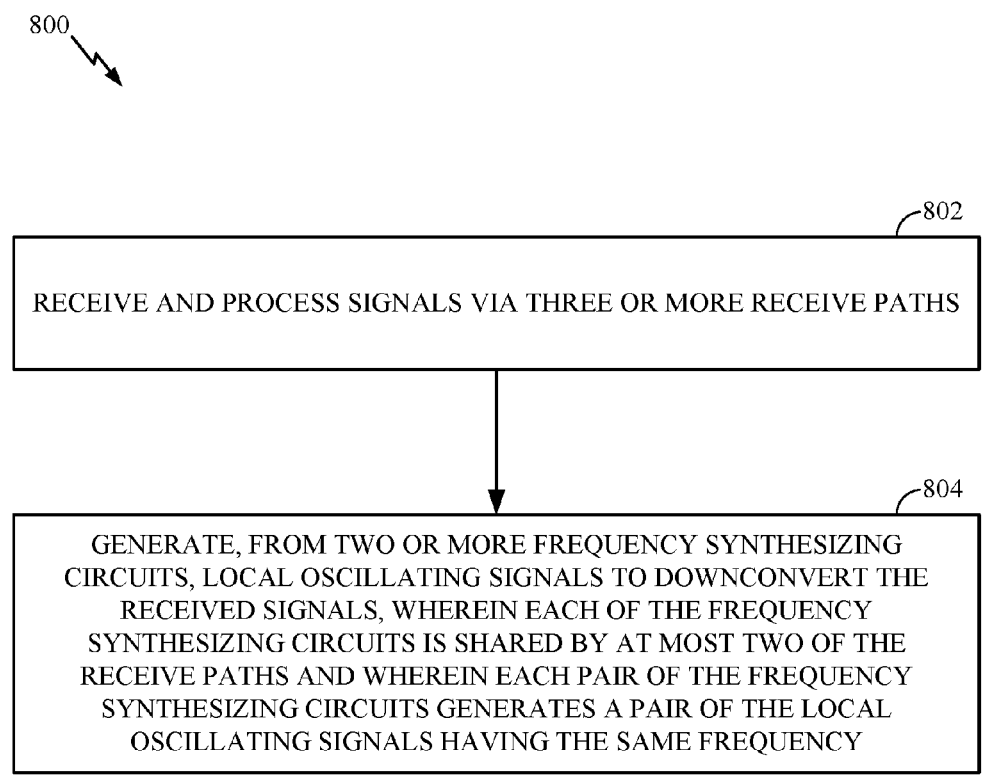
FIGS. 8 and 9 are flow diagrams of example operations for multi-way diversity, in accordance with certain aspects of the present disclosure.

FIG. 8 is a flow diagram of example operations 800 for using multi-way diversity receivers with multiple frequency synthesizing circuits. The operations 800 may be performed, for example, by a multi-way diversity receiver or a CA transceiver described above, such as the 4-way diversity receiver 400.

The operations 800 may begin, at block 802, with the diversity receiver receiving and processing signals via three or more receive paths. At block 804, the diversity receiver may generate, from two or more frequency synthesizing circuits, local oscillating signals to downconvert the received signals. Each of the frequency synthesizing circuits may be shared by at most two of the receive paths. Each pair of the frequency synthesizing circuits may generate a pair of the local oscillating signals having the same frequency.

According to certain aspects, the three or more receive paths include 8 receive paths, and the two or more frequency synthesizing circuits include 4 frequency synthesizing circuits. In this case, the generating at block 804 may involve generating a first two local oscillating signals having the same first frequency with a first pair of the 4 frequency synthesizing circuits. The generating at block 804 may also entail generating a second two local oscillating signals having the same second frequency with a second pair of the 4 frequency synthesizing circuits.

Figure 9:
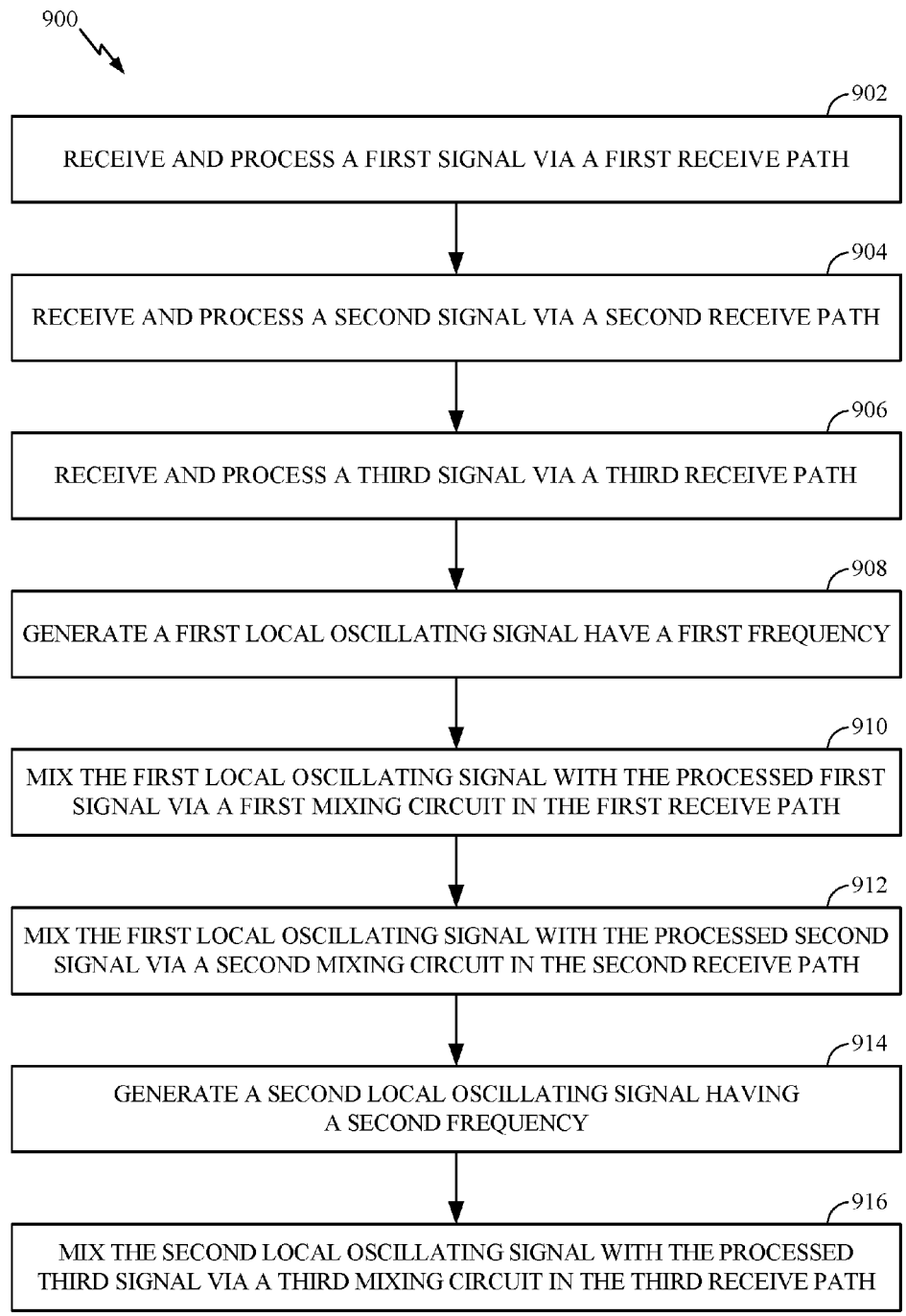

FIG. 9 is a flow diagram of example operations 900 for employing multi-way diversity receivers with multiple frequency synthesizing circuits. The operations 900 may be performed, for example, by a multi-way diversity receiver or a CA transceiver described above, such as the 4-way diversity receiver 400.

The operations 900 may begin, at block 902, with the diversity receiver receiving and processing a first signal via a first receive path. At block 904 and block 906, the diversity receiver may receive and process a second signal via a second receive path and receive and process a third signal via a third receive path, respectively. The diversity receiver may generate a first local oscillating signal having a first frequency at block 908. At block 910 and block 912, the diversity receiver may mix the first local oscillating signal with the processed first signal via a first mixing circuit in the first receive path and mix the first local oscillating signal with the processed second signal via a second mixing circuit in the second receive path, respectively. The diversity receiver may generate a second local oscillating signal having a second frequency equal to the first frequency at block 914. At block 916, the diversity receiver may mix the second local oscillating signal with the processed third signal via a third mixing circuit in the third receive path.

According to certain aspects, the operations 900 may further involve the diversity receiver receiving and processing a fourth signal via a fourth receive path. In this case, the diversity receiver may mix the second local oscillating signal with the processed fourth signal via a fourth mixing circuit in the fourth receive path. For certain aspects, the operations 900 may further entail the diversity receiver receiving and processing a fifth signal via a fifth receive path and receiving and processing a sixth signal via a sixth receive path. In this case, the diversity receiver may generate a third local oscillating signal having a third frequency, mix the third local oscillating signal with the processed fifth signal via a fifth mixing circuit in the fifth receive path, and mix the third local oscillating signal with the processed sixth signal via a sixth mixing circuit in the sixth receive path. For certain aspects, the operations 900 may further include the diversity receiver receiving and processing a seventh signal via a seventh receive path and receiving and processing an eighth signal via an eighth receive path. In this case, the diversity receiver may generate a fourth local oscillating signal having a fourth frequency, mix the fourth local oscillating signal with the processed seventh signal via a seventh mixing circuit in the seventh receive path, and mix the fourth local oscillating signal with the processed eighth signal via an eighth mixing circuit in the eighth receive path.

The various operations or methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting may comprise a transmitter (e.g., the transceiver front end 254 of the user terminal 120 depicted in FIG. 2 or the transceiver front end 222 of the access point 110 shown in FIG. 2) and/or an antenna (e.g., the antennas 252ma through 252mu of the user terminal 120m portrayed in FIG. 2 or the antennas 224a through 224ap of the access point 110 illustrated in FIG. 2). Means for receiving may comprise a receiver (e.g., the transceiver front end 254 of the user terminal 120 depicted in FIG. 2 or the transceiver front end 222 of the access point 110 shown in FIG. 2) and/or an antenna (e.g., the antennas 252ma through 252mu of the user terminal 120m portrayed in FIG. 2 or the antennas 224a through 224ap of the access point 110 illustrated in FIG. 2). Means for processing or means for determining may comprise a processing system, which may include one or more processors, such as the RX data processor 270, the TX data processor 288, and/or the controller 280 of the user terminal 120 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A wireless reception diversity circuit, comprising:
   three or more receive paths configured to process received signals; and
   two or more frequency synthesizing circuits comprising at least a pair of the frequency synthesizing circuits configured to generate local oscillating signals having a same frequency and each having a voltage-controlled oscillator (VCO), at least one of the frequency synthesizing circuits of the at least the pair of the frequency synthesizing circuits being configured to downconvert the received signals for two of the three or more receive paths.

2. The diversity circuit of claim 1, wherein a single receive path is connected with one of the frequency synthesizing circuits that is not connected with any other receive path.

3. The diversity circuit of claim 1, wherein each of the receive paths is associated with its own antenna.

4. The diversity circuit of claim 1, wherein different pairs of the frequency synthesizing circuits generate pairs of local oscillating signals having different frequencies.

5. The diversity circuit of claim 1, wherein the three or more receive paths comprise 8 receive paths and wherein the two or more frequency synthesizing circuits comprise 4 frequency synthesizing circuits.

6. The diversity circuit of claim 5, wherein a first pair of the 4 frequency synthesizing circuits is configured to generate a first two local oscillating signals having the same first frequency and wherein a second pair of the 4 frequency synthesizing circuits is configured to generate a second two local oscillating signals having the same second frequency.

7. The diversity circuit of claim 5, wherein a first number of the 8 receive paths is designated for a first carrier and wherein a second number of the 8 receive paths is designated for a second carrier, different from the first carrier.

8. The diversity circuit of claim 5, wherein the 8 receive paths are designated for a single carrier and wherein the 4 frequency synthesizing circuits are configured to generate four local oscillating signals having the same frequency.

9. The diversity circuit of claim 5, wherein 4 of the 8 receive paths and 2 of the 4 frequency synthesizing circuits are disabled.

10. The diversity circuit of claim 1, wherein the wireless reception diversity circuit is part of a carrier aggregation (CA) transceiver and wherein each of the frequency synthesizing circuits is a CA frequency synthesizing circuit for a particular component carrier.

11. The diversity circuit of claim 10, wherein a portion of the CA transceiver is disabled.

12. The diversity circuit of claim 1, wherein each of the frequency synthesizing circuits comprises at least one of an amplifier, a buffer, an attenuator, or a programmable divider and wherein each receive path comprises a low noise amplifier (LNA) configured to amplify one of the received signals and a mixing circuit configured to mix the amplified signal with one of the local oscillating signals.

13. The diversity circuit of claim 1, wherein a pair of the local oscillating signals having the same frequency are configured for generation by two of the VCOs of the frequency synthesizing circuits configured to output signals having two different frequencies and by two frequency dividers with different divisors.

14. A wireless reception diversity circuit, comprising:
   a first receive path;
   a second receive path;
   a third receive path;
   a first frequency synthesizing circuit coupled with a first mixing circuit in the first receive path and with a second mixing circuit in the second receive path, the first frequency synthesizing circuit being configured to generate a first local oscillating signal having a first frequency; and
   a second frequency synthesizing circuit coupled with a third mixing circuit in the third receive path, the second frequency synthesizing circuit being configured to generate a second local oscillating signal having a second frequency equal to the first frequency.

15. The diversity circuit of claim 14, further comprising a fourth receive path, wherein the second local oscillating signal is connected with a fourth mixing circuit in the fourth receive path.

16. The diversity circuit of claim 15, further comprising:
   a fifth receive path;
   a sixth receive path; and
   a third frequency synthesizing circuit configured to generate a third local oscillating signal having a third frequency, wherein the third local oscillating signal is connected with a fifth mixing circuit in the fifth receive path and with a sixth mixing circuit in the sixth receive path.

17. The diversity circuit of claim 16, further comprising:
   a seventh receive path;
   an eighth receive path; and
   a fourth frequency synthesizing circuit configured to generate a fourth local oscillating signal having a fourth frequency equal to the third frequency, wherein the fourth local oscillating signal is connected with a seventh mixing circuit in the seventh receive path and with an eighth mixing circuit in the eighth receive path.

18. The diversity circuit of claim 17, wherein the third frequency is different from the first frequency.

19. The diversity circuit of claim 17, wherein the first, second, third, and fourth receive paths are designated for a first carrier and wherein the fifth, sixth, seventh, and eighth receive paths are designated for a second carrier, different from the first carrier.

20. The diversity circuit of claim 17, wherein the first, second, third, fourth, fifth, sixth, seventh, and eighth receive paths are designated for a single carrier and wherein the first, second, third, and fourth local oscillating signals have the same frequency.

21. The diversity circuit of claim 14, wherein the wireless reception diversity circuit is part of a carrier aggregation (CA) transceiver and wherein each of the first and second frequency synthesizing circuits is a CA frequency synthesizing circuit.

22. The diversity circuit of claim 21, wherein a portion of the CA transceiver is disabled.

23. The diversity circuit of claim 14, wherein each of the first and second frequency synthesizing circuits comprises a different voltage-controlled oscillator (VCO) and at least one of an amplifier, a buffer, an attenuator, or a programmable divider.

24. The diversity circuit of claim 14, wherein the first frequency synthesizing circuit comprises a first voltage-controlled oscillator (VCO) configured to generate the first local oscillating signal, wherein the second frequency synthesizing circuit comprises a second VCO configured to generate the second local oscillating signal, and wherein the first and second VCOs are configured to concurrently output signals having two different frequencies.

25. The diversity circuit of claim 14, wherein each of the first, second, and third receive paths is associated with its own antenna.

26. A method for wireless communications, comprising:
receiving and processing signals via three or more receive paths; and
generating, from two or more frequency synthesizing circuits each comprising a voltage-controlled oscillator (VCO), local oscillating signals to downconvert the received signals, each pair of the frequency synthesizing circuits generating a pair of the local oscillating signals having the same frequency, and at least one frequency synthesizing circuit of the pair of the frequency synthesizing circuits generating the local oscillating signals to downconvert two of the received signals.

27. The method of claim 26, wherein the three or more receive paths comprise 8 receive paths, wherein the two or more frequency synthesizing circuits comprise 4 frequency synthesizing circuits, and wherein the generating comprises:
generating first two local oscillating signals having the same first frequency with a first pair of the 4 frequency synthesizing circuits; and
generating second two local oscillating signals having the same second frequency with a second pair of the 4 frequency synthesizing circuits.

28. A method for wireless communications, comprising:
receiving and processing a first signal via a first receive path;
receiving and processing a second signal via a second receive path;
receiving and processing a third signal via a third receive path;
generating a first local oscillating signal having a first frequency via a first frequency synthesizing circuit using a first voltage-controlled oscillator (VCO);
mixing the first local oscillating signal with the processed first signal via a first mixing circuit in the first receive path;
mixing the first local oscillating signal with the processed second signal via a second mixing circuit in the second receive path;
generating a second local oscillating signal having a second frequency equal to the first frequency via a second frequency synthesizing circuit using a second VCO; and
mixing the second local oscillating signal with the processed third signal via a third mixing circuit in the third receive path.

29. The method of claim 28, further comprising:
receiving and processing a fourth signal via a fourth receive path; and
mixing the second local oscillating signal with the processed fourth signal via a fourth mixing circuit in the fourth receive path.

30. The method of claim 29, further comprising:
receiving and processing a fifth signal via a fifth receive path;
receiving and processing a sixth signal via a sixth receive path;
generating a third local oscillating signal having a third frequency;
mixing the third local oscillating signal with the processed fifth signal via a fifth mixing circuit in the fifth receive path;
mixing the third local oscillating signal with the processed sixth signal via a sixth mixing circuit in the sixth receive path;
receiving and processing a seventh signal via a seventh receive path;
receiving and processing an eighth signal via an eighth receive path;
generating a fourth local oscillating signal having a fourth frequency;
mixing the fourth local oscillating signal with the processed seventh signal via a seventh mixing circuit in the seventh receive path; and
mixing the fourth local oscillating signal with the processed eighth signal via an eighth mixing circuit in the eighth receive path.

* * * * *